(12) United States Patent
Hambitzer

(10) Patent No.: US 8,906,556 B2
(45) Date of Patent: Dec. 9, 2014

(54) RECHARGEABLE ELECTRO CHEMICAL BATTERY CELL

(75) Inventor: Guenther Hambitzer, Pfinztal (DE)

(73) Assignee: Alevo Research AG, Zug (CH)

( * ) Notice: Subject to any disclaimer, the term of this patent is extended or adjusted under 35 U.S.C. 154(b) by 977 days.

(21) Appl. No.: 12/513,547

(22) PCT Filed: Nov. 10, 2007

(86) PCT No.: PCT/EP2007/009744
§ 371 (c)(1),
(2), (4) Date: May 5, 2009

(87) PCT Pub. No.: WO2008/058685
PCT Pub. Date: May 22, 2008

(65) Prior Publication Data
US 2010/0062341 A1     Mar. 11, 2010

(30) Foreign Application Priority Data

Nov. 14, 2006 (EP) .................................... 06023611

(51) Int. Cl.
| | |
|---|---|
| H01M 4/13 | (2010.01) |
| H01M 4/02 | (2006.01) |
| H01M 2/14 | (2006.01) |
| H01M 4/131 | (2010.01) |
| H01M 4/133 | (2010.01) |
| H01M 4/40 | (2006.01) |
| H01M 4/485 | (2010.01) |
| H01M 4/505 | (2010.01) |
| H01M 4/525 | (2010.01) |
| H01M 10/0525 | (2010.01) |
| H01M 10/054 | (2010.01) |
| H01M 10/0568 | (2010.01) |
| H01M 10/0569 | (2010.01) |
| H01M 4/62 | (2006.01) |

(52) U.S. Cl.
CPC ............... *H01M 2/14* (2013.01); *H01M 4/131* (2013.01); *H01M 4/133* (2013.01); *H01M 4/40* (2013.01); *H01M 4/485* (2013.01); *H01M 4/505* (2013.01); *H01M 4/525* (2013.01); *H01M 10/0525* (2013.01); *H01M 10/054* (2013.01); *H01M 10/0568* (2013.01); *H01M 10/0569* (2013.01); *H01M 4/621* (2013.01); *Y02E 60/122* (2013.01)
USPC ..................................... 429/231.95; 429/209

(58) Field of Classification Search
None
See application file for complete search history.

(56) References Cited

U.S. PATENT DOCUMENTS

| | | | | |
|---|---|---|---|---|
| 4,177,329 | A * | 12/1979 | Dey et al. | ........................ 429/101 |
| 7,579,112 | B2 * | 8/2009 | Chiang et al. | ................. 429/209 |
| 2003/0099884 | A1 | 5/2003 | Chiang et al. | |

FOREIGN PATENT DOCUMENTS

| | | |
|---|---|---|
| JP | 60230367 A | 11/1985 |
| JP | 2001052758 A | 2/2001 |

(Continued)

*Primary Examiner* — Sarah A Slifka
(74) *Attorney, Agent, or Firm* — Rothwell, Figg, Ernst & Manbeck, P.C.

(57) ABSTRACT

The invention relates to a rechargeable electrochemical battery cell having a negative electrode, an electrolyte, and a positive electrode. The negative electrode comprises an electronically conductive substrate (12) at which an active metal (24) of the negative electrode is deposited by electrolysis during the charging of the cell. A porous structure (13) that contains the active mass (17) of the positive electrode is arranged in the vicinity of the substrate (12) of the negative electrode (5) in such a manner that the active metal (17) of the negative electrode that is deposited during the charging of the cell (3) penetrates into the pores (14) of the porous structure (13) comprising the active mass of the positive electrode and is deposited further therein, at least in part, in metallic form.

49 Claims, 3 Drawing Sheets

(56) References Cited

FOREIGN PATENT DOCUMENTS

| | | | |
|---|---|---|---|
| WO | 00/44061 A | 7/2000 |
| WO | 00/79631 A | 12/2000 |
| WO | 03/061036 A2 | 7/2003 |
| WO | 2005/031908 A2 | 4/2005 |

* cited by examiner

RECHARGEABLE ELECTRO CHEMICAL BATTERY CELL

This application is a 35 U.S.C. 371 National Phase Entry Application from PCT/EP2007/009744, filed Nov. 10, 2007, which claims the benefit of European Patent Application No. 06023611.4 filed on Nov. 14, 2006, the disclosure of which is incorporated herein in its entirety by reference.

The invention relates to a rechargeable, preferably non-aqueous, electrochemical battery cell, having a negative electrode, an electrolyte, and a positive electrode as well as a reservoir for storing active metal which results from the electrode reaction at the negative electrode during the charging of the cell.

In particular, the invention relates to a battery cell in which the active metal (whose oxidation state is changed during the charging and discharging of the cell due to the electrode reaction at the negative electrode) is an alkali metal, alkaline earth metal or a metal of the second subgroup of the periodic system, lithium being particularly preferred. Hereafter, without limiting the generality, reference will be made to lithium as active metal of the negative electrode.

The electrolyte used in the invention is preferably based on $SO_2$. The term "$SO_2$-based electrolyte", is understood to refer to electrolytes which contain $SO_2$ not only in low concentration as an additive, but in which the mobility of the ions of the conductive salt that is contained in the electrolyte and that is responsible for the charge transport is at least partly due to the $SO_2$. In the case of an alkali metal cell, it is preferable to use a tetrahaloaluminate of the alkali metal, for example $LiAlCl_4$, as conductive salt. A rechargeable alkali metal cell having an $SO_2$-based electrolyte is referred to as a rechargeable alkali metal-$SO_2$ cell.

The invention also relates to cells with other electrolytes which contain other conductive salts (e.g. halogenides, oxalates, borates, phosphates, arsenates, gallates) and other solvents that provide for the mobility of the ions. The solvents can be inorganic (for example sulfurylchloride, thionylchloride), organic (for example ethers, ketones, carbonates, esters), and ionic liquids. It is also feasible to use mixtures of the conductive salts and solvents mentioned.

The required safety is an important problem of battery cells. In particular strong heating may cause critical safety conditions in many types of cells. It can happen that the cell housing ruptures or at least becomes leaky such that harmful gaseous or solid substances are released, or a fire may occur.

Especially critical are battery cells in which a strong increase of the temperature in the interior of the cell causes an increase of exothermic reactions which in turn leads to a further increase in temperature. This self-potentiating effect is referred to as "thermal runaway".

Battery manufacturers attempt to prevent any "thermal runaway" by controlling the charging and/or discharging circuit by electronic, mechanical or chemical means, such that the flow of electric current is interrupted below a critical temperature level. To this end, for example, pressure-sensitive mechanical or temperature-sensitive electronic switches are integrated.

In order to prevent the risks associated with the accumulation of lithium in unbound (metallic) form, commercially available alkali metal battery cells, in particular Li ion cells, use graphite intercalation electrodes as negative electrodes. In Li ion cells, the lithium resulting from the electrode reaction at the negative electrode (by taking up an electron) during the charging of the cell is incorporated into the layered lattice of the graphite. For this reason, Li ion cells usually do not contain accumulations of metallic lithium during normal operation.

However, safety problems still result in many cases despite these and other measures. It has happened, for example, that portable computers burst into flames as a consequence of a "thermal runaway" of the lithium ion cells installed therein. According to a publication from July 2006, 1.6 million lithium batteries have been recalled by their manufacturers since 2000 due to potential safety problems, and the responsible US authority (Product Safety Commission) has received more than 80 reports indicating that users were injured when their mobile phones burst into flames or exploded.

Despite these safety problems, alkali metal cells are very important for practical applications, especially since they are characterized by high cell voltage and high energy density (electrical capacity per unit volume) and high specific energy (electrical capacity per unit weight).

On this basis, the invention addresses the problem to further improve battery cells, in particular alkali metal cells, with regard to their performance data (energy density, power density) while simultaneously allowing a very high safety standard.

This technical problem is solved by a rechargeable battery cell of the type described above, in which the cell contains a porous structure in which the active mass of the positive electrode is contained and which is arranged in the vicinity of an electronically conductive substrate of the negative electrode such that at least a part of the active metal resulting from the electrode reaction at the negative electrode penetrates into the pores of the porous structure comprising the active mass of the positive electrode and is stored therein, whereby the storage of the active metal in the pores of the porous structure comprising the active mass of the positive electrode is provided, at least in part, by deposition in metallic form.

The term "active mass of the positive electrode" is understood to refer to a component of the cell which changes its electric charge state during the redox reaction at the positive electrode. In the cells according to the invention, the active mass of the positive electrode preferably is an intercalation compound into which the active metal can be incorporated. In particular metal compounds (for example oxides, halogenides, phosphates, sulfides, chalcogenides, selenides) are suitable. Compounds of a transition metal M, in particular of an element of atomic numbers 22 to 28, are particularly suitable. Also suitable are mixed oxides and other mixed compounds of metals. Lithium-cobalt oxide is particularly preferred. During discharging of a cell of this type, ions of the active metal are incorporated into the positive active mass. For reasons of charge neutrality, this leads to an electrode reaction of the positive active mass at the electrode during which an electron transition occurs from a current collector element of the electrode into the positive active mass. The reverse process occurs during charging: the active metal (for example lithium) is removed from the positive active mass in the form of an ion, causing an electron transition from the positive active mass into the current collector element of the positive electrode.

According to a basic principle of battery engineering, the active metal of the negative electrode and the active mass of the positive electrode are separated from each other such that no electronic conduction between the electrodes is possible inside the cell. Such internal electronic conduction would interfere with the function of the cell in multiple ways:

Both the conversion of electrical energy to chemical energy during the charging of the cell and the reverse conversion of chemical energy to electrical energy upon discharging are based on electrode reactions (redox reactions) that take place at both electrodes between the active material and the electronically conductive current collector element (substrate) of the respective electrode. The electronic current resulting from the electrode reactions is meant to flow through the outer electrical circuit. An electronically conductive contact between the active metal of the negative electrode and the active mass of the positive electrode inside the cell forms a short circuit causing a direct transition of electrons between the electrodes within the cell. A short-circuit of this type leads to a loss of charge, i.e. to reduced efficiency during charging and a loss of stored electrical energy caused by self-discharge.

Short-circuits cause strong electric currents which again cause strong generation of heat. This can lead to a "thermal runaway" and its associated safety problems.

The required separation of the active masses is usually achieved by locating these masses in spatially separated layers. The layers are in most cases separated by a separator. The term "separator" is used in battery engineering to refer to a material that is suited to insulate the electrodes, in particular their active masses, with regard to electronic conduction, while, on the other hand, allowing the required ionic conduction. The separator divides the overall volume of the battery cell into two partial spaces, namely a positive electrode space and a negative electrode space, between which an exchange of charge by means of the ions of a conductive salt is possible, whereas an electronic exchange of charges is not possible. This is true regardless of the shape of the cell including, for example, spirally wound (so called "jelly roll"), in which the partial spaces are provided in the form of thin parallel layers that are wound about a common axis.

US patent application 2003/0099884 recommends interpenetrating electrodes for battery cells. According to this document, these are electrodes forming a network which extends in two or three directions of space, whereby each electrode penetrates into the other. This is meant to achieve a higher power density (at unchanged high energy density) compared to the common thin layer cells. In the embodiments described in the document, the interpenetrating electrodes consist of insertion materials, preferably intercalation materials, the active metal being bound in the lattice structure thereof. In order to achieve a complete separation of the electrodes despite their interpenetrating structure, with electrolyte present in the spaces between the electrodes, the document suggests a range of special measures, in particular by mutually matched electrostatic attraction and/or repulsion of the electrode materials and the electrolyte. This is meant to exclude with certainty any short-circuiting.

In contrast to this document and to the lithium ion batteries discussed above, the invention relates to a type of cells in which the active metal is deposited during the charging process at least in part in metallic form (i.e. not bound, in particular not within an insertion material or intercalation material). WO2003/061036 refers to this type of cells and proposes, in order to achieve the required safety with the lithium being present in metallic form, to provide a layer having a microporous structure, in immediate contact with the electronically conductive substrate of the negative electrode, the layer having a pore size such that the active mass deposited during the charging process grows into its pores in a controlled manner. This layer is termed "deposition layer". The design of the deposition layer is such that its pores are completely filled by the active metal growing into the porous structure, whereby the active metal contacts the electrolyte essentially only at the relatively small boundary areas at which further deposition takes place (within the pores). The publication describes additional measures regarding the layer structure of the deposition layer aiming to achieve the desired pore size and porosity as well as the required safety. This includes the use of a plurality of materials with different particle sizes to form the porous structure and also includes the use of an additional salt that is integrated into the deposition layer.

WO2005/031908 describes a similar design having a deposition layer. This publication contains the further information that there is no absolute need to have a separator between the deposition layer of the negative electrode and a layer formed by the active mass of the positive electrode. Rather, the boundary between the positive electrode and the negative electrode is to be designed such that the active metal deposited at the negative electrode during the charging of the cell contacts the active mass of the positive electrode in such a manner that locally limited short-circuit reactions can occur at the surfaces thereof.

The inventors have found that, surprisingly, an electrode design is not only possible but even particularly advantageous, in which the active mass of the positive electrode and the active metal of the negative electrode deposited during the charging of the cell are not located in separate (normally layer-shaped) electrode compartments, but in which the active metal, being, at least in part, in metallic form, grows into a porous structure which contains the active mass of the positive electrode. With this design there is contact, and thus the risk of short-circuiting, between the two active masses at the very large internal surface (preferably more than 20 cm$^2$/cm$^3$) of the porous structure of the positive electrode.

The porous structure consists of a structure-forming (solid) material and pores distributed therein (preferably homogeneously). Basically, any structure can be used which has a suitable porosity for taking up the lithium which is deposited during the charging of the cell. A porous structure made from particles is preferred, the structure-forming particles being preferably bonded to each other such that they form a fixed particle composite structure However, in principle, the porous structure comprising the active mass of the positive electrode can also consist of particles that are not bonded to each other. In this case suitable measures (e.g. stamping into the cell, pressing) have be used to achieve that the particles are in sufficiently tight and permanent contact to each other to provide for the required electronic conductivity.

According to a preferred embodiment of the invention, the electronic conductivity of the porous structure comprising the active mass of the positive electrode is improved by integrating into its structure-forming material an electronically conductive material as conductivity-improving material. Suitable for this purpose are, for example, carbon particles or metal particles (e.g. tinsel, chips). Carbon is particularly preferred. According to further preferred embodiments, the porous structure containing the positive active mass can be formed by incorporating the structure-forming particles into a metal foam (for example, nickel foam). Another possibility is to fix them to a sheet of metal or to expanded metal (rib mesh) by pressing or by means of a binding agent.

The porous structure comprising the active mass of the positive electrode preferably is shaped as a layer extending parallel to the electronically conductive substrate (which is also designated as "current collector element") of the negative electrode. The porous structure comprising the active mass of the positive electrode will hereinafter also be designated as "porous positive electrode layer". Preferably, the cell according to the invention has only two layers, namely the usually very thin current collector element (substrate) of the negative electrode and the relatively much thicker positive electrode layer. Therefore the required cell volume is mainly determined by the volume of the porous positive electrode layer. No additional volume for storing the active metal deposited during the charging of the cell is required. This results in a large increase of the energy density. Cells according to the invention have an energy density of preferably at least 750 Wh/l, wherein values of a least 1000 or even at least 1250 Wh/l are particularly preferred. According to an even more preferred embodiment a cell according to the invention may even have an energy density of at least 1500 Wh/l.

Surprisingly, simultaneously an improved safety is achieved. The invention results in a macroscopically essentially homogeneous distribution of the components to the invention. This provides in reality the conditions which are presumed for common safety calculations based on the Berthelot-Roth' product (BRP). This means that a degree of safety calculated theoretically according to the BRP is achieved in reality.

Calculating the BRP, the presumption is made that the reaction components are distributed homogeneously such that optimal reactivity is ensured. If the components are not distributed homogeneously, but rather spatially separated (such as e.g. in the electrode layers of a customary battery) the actual explosibility is higher than expected according to the calculated BRP. A substance is called explosible if it has a BRP of $1200 \times 10^6$ kJ/m$^3$ or higher.

A primary (non-rechargeable) lithium/lithiumdioxide-system with a liquid $SO_2$-Cathode has e.g. a calculated BRP-value of approx. $4000 \times 10^6$ kJ/m$^3$. Thus it would be explosible even if the components were mixed homogenously. In contrast the rechargeable lithium/lithium-cobalt oxide system with inorganic electrolyte solution $LiAlCl_4 \times SO_2$ has a calculated BRP value of approx. $200 \times 10^6$ kJ/m$^3$ if mixed homogenously. The substantially lower value for a cell having a lithiumcobaltoxide electrode according to the invention results from the reduction of the concentration of the components Li and $SO_2$ caused by an inert non-reactive substance, namely $LiCoO_2$. A condition of this effect is, however, that the distribution in the reduced-concentration system is homogenous. This is achieved because a cell according to the invention can be presumed to have a macroscopically homogeneous mixture such that the calculated BRP value is an essentially accurate measure of the actual explosion safety.

The invention leads to an "inherently safe" cell, i.e. a battery cell whose safety is not based on additional external safety measures, but rather on its physico-chemical properties and internal design features. Another important aspect in this context is that only a very small amount of electrolyte is required. Preferably, the volume of the electrolyte in the cell corresponds to no more than twice the free pore volume of the porous structure. More preferably it even corresponds at most to the free pore volume of the porous structure of the positive electrode. To further improve the function of the cell and, in particular, its safety, an additional salt, in addition to the conductive salt of the electrolyte, can be present in the cell. In particular a halogenide, preferably a fluoride, can be used. The cation of the additional salt can be identical to the cation of the conductive salt or it may be different. Li$^+$ or any other alkali metal cation is preferred as cation of the additional salt. The additional salt is preferably contained in the electrolyte.

The invention is particularly advantageous in combination with a battery cell according to international patent application WO 00/79631 A1, which can be operated with a very small amount of electrolyte. This document describes a cell, having a negative electrode which contains in its charged state an active metal, in particular an alkali metal, having an electrolyte based on sulfur dioxide and comprising a positive electrode which contains the active metal and from which during charging ions are released into the electrolyte. The electrolyte is sulfur-dioxide-based. At the negative electrode, a self-discharge reaction takes place, in the course of which the sulfur dioxide of the electrolyte reacts with the active metal of the negative electrode to form a compound of low solubility. According to the invention described in the international patent application, the quantity of electrochemical charge of the sulfur dioxide contained in the cell, calculated with one Faraday per mol of sulfur dioxide, is less than the quantity of electrochemical charge of the active metal that can theoretically be stored in the positive electrode. This allows the battery cell to be operated with a significantly reduced quantity of electrolyte while simultaneously achieving an improved function. For further details, reference shall be made to the cited document whose content is hereby incorporated by references as content of the present patent application.

If a binding agent is present in the porous structure for generating a particle composite structure, its volume fraction should not be too high. Preferably it is less than 50%, more preferably less than 30%, of the entire solids volume of the porous structure. The binding agent proportion should be so small that it is concentrated only at the contact sites between the structure-forming particles. For this reason, binding agent fractions (ratio of binding agent volume to total volume of the structure-forming particles) of less than 20% or even less than 10% are particularly preferred.

The positive active mass is contained in the porous structure of the positive electrode layer preferably in a concentration of at least 50 wt. %. More preferably, by far the major share of the structure-forming particles of the porous structure, i.e. a fraction of at least 80%, consist of the material of the positive active mass. Polytetrafluoroethylene is a suitable binding agent, to name an example.

The porosity of the porous positive electrode layer, i.e. the ratio of the volume of the pores and the total volume of the layer, can vary substantially. Preferably, the porosity within the porous positive electrode layer is between 20 and 80%, more preferably between 25 and 75%, and particularly preferably between 25 and 50%. In order to achieve an optimal energy density, the total pore volume should be only insignificantly larger than the maximal volume of the active metal which is deposited at the substrate of the negative electrode during charging.

The mean diameter of the pores of the porous positive electrode layer can vary substantially. If the active metal is deposited in the form of so-called whiskers or dendrites, the mean pore diameter should be on the order of size of the whiskers or dendrites. Usually, this corresponds to approx. 1 to 2 μm in an $SO_2$-based electrolyte. Smaller values can lead to an increase in the over-voltage required for charging, but are in principle possible. Likewise, larger mean pore diameters may be acceptable depending on the particular case. Preferably, the mean pore diameter of the porous positive electrode layer should be no more than 500 μm, preferably no more than 100 μm, and particularly preferably no more than 10 μm.

Surprisingly it has been found, that when a cell according to the invention is in operation, short circuiting within the pores of the positive electrode layer, which would interfere with its long term function, is prevented by a layer covering the internal surface thereof. This layer is referred to as "intraporous separator layer".

Preferably at least a part of the intraporous separator layer is generated within the cell (in situ). This takes place in particular during the charging and/or discharging, in particular during the charging of the cell. The in-situ-formation of the separator layer can take place at the production site of the manufacturer and/or during practical use of the cell at the location of the user. Ideally it takes place without introducing additional layer-forming substances which have to be removed after the layer formation.

In order to allow generation of an intraporous separator layer during charging of the cell, it is (of course) necessary that the cell is ready for charging, i.e. assembled and filled with electrolyte. The production process must, however, not be totally completed before the first charging takes place, during which an intraporous separator layer is formed.

The initial formation of the intraporous separator layer can take place during first charging cycles of the battery cell. However, the intraporous separator layer can also be generated or regenerated during the later operation. This applies, in particular, if the layer gets damaged. Any missing parts of the intraporous separator layer are newly generated and/or supplemented during subsequent charging cycles. This "repair mechanism" is maintained over the entire serviceable life of the cell and ensures permanently safe and functional cells.

A reaction mechanism, by means of which a covering layer suitable as intraporous separator layer is formed on the internal surface of the porous positive electrode layer, can take place in different cell systems. General rules for the selection of suitable cell systems cannot be given. However, with the knowledge of the present invention it is possible with little effort to test potentially suitable cell systems for checking whether the desired formation of an intraporous separator layer (in particular during the charging of the cell) takes place therein.

In this context, cell systems containing an electrolyte which reacts with the other components of the cell, in particular during the charging of the cell, to form a covering layer having the properties of an intraporous separator layer (as described above) are preferred.

An electrolyte containing $SO_2$ is particularly suitable. This does not mean that the electrolyte is necessarily "$SO_2$-based" as per the definition given above. Rather, the $SO_2$ can be used at a lower concentration in a mixture with another electrolyte (examples have been named above). In particular mixtures including electrolytes containing organic solvents can be suitable.

If—according to a preferred embodiment of the invention—an intraporous separator layer is formed in situ during operation of the cell and if further—as is also preferred—the formation of the intraporous separator layer includes, as one of the reactants, $SO_2$ contained in the electrolyte, it is necessary to distinguish the $SO_2$-concentration before the first operation of the cell, e.g. before the first charging, from the $SO_2$-concentration during later operation of the cell, after formation of the intraporous separator layer. With these facts in mind the following approximate information regarding a preferred $SO_2$-concentration can be provided:

a) Before the first charging of the cell:
   For an electrolyte in which $SO_2$ is the only solvent: At least 0.5 mol $SO_2$ per mol conductive salt.
   For mixed electrolytes containing $SO_2$ as an additional component: At least 0.1 mol, preferably at least 0.5 mol and particularly preferred at least 1.0 mol $SO_2$ per mol conductive salt.
b) During routine operation of the cell after formation of the interporous separator layer: At least 0.1 mol $SO_2$ per mol conductive salt.

In principle the cell remains operable even if the $SO_2$ is almost completely consumed during formation of the separator layer such that no liquid electrolyte is present after such interporous separator layer formation. The inventors have found that the electrolyte must not necessarily be present in the liquid state because in the context of the invention an electric conductivity which is sufficient for many purposes, i.e. a sufficiently low cell resistance, can be achieved even with an almost completely solidified electrolyte. In such a case the $SO_2$ content of the cell can be very low, e.g. 0.1 mol $SO_2$ per mol conductive salt.

The intraporous separator layer can also be formed by coating the internal surface of the porous positive electrode layer during the manufacture of the cell. A variety of substances are suitable for this purpose, e.g. materials based on ion-conductive glasses, ion-conductive ceramic masses, and ion-conductive plastic materials. A suitable material must meet the following conditions:
   It must allow application in the form of a sufficiently thin layer to the internal surface (preferably to the external surface also) of the porous positive electrode layer.
   The material must be chemically stabile, i.e. inert with respect to the other components present in the cell, also in an electric field.

The intraporous separator layer can be generated and/or applied by a variety of suitable methods. These include:
   Coating the structure-forming particles prior to their use for formation of the porous positive electrode layer;
   Coating methods based on the passage of gas (for example physical vapor deposition, chemical vapor deposition, plasma or high-current discharge). Methods involving passing a liquid through the layer can also be suitable.
   Methods involving coating from the gas phase, in particular sputtering, wherein the atoms penetrate into the porous positive electrode layer such that they cover its internal surface.

The two options of forming an intraporous separator layer described above (in situ or coating during manufacture prior to the first charging of the cell) can also be combined. For example, a coating method can be carried out in which the porous positive electrode layer is partly (preferably to the larger extent) coated prior to the first charging, using one of the methods described above, whereas the complete intraporous separator layer is formed only during operation of the cell (mainly during initial charging cycles).

If not at least the external surface of the porous positive electrode layer is electronically-insulating by a suitable coating prior to assembly into the cell, it is useful to provide, at the boundary between the substrate of the negative electrode and the porous structure comprising the active mass of the positive electrode, means preventing electronic conduction, but allowing passage of the active metal resulting from the electrode reaction at the negative electrode during the charging of the cell, such means preventing electronic short-circuits. In particular, the following means are suitable for this purpose
   coating of the substrate of the negative electrode with an electronically-insulating, but lithium ion-permeable layer;
   coating of the external surface of the porous positive electrode layer with an electronically-insulating, but lithium ion-permeable layer; and
   incorporation of a very thin, porous and electronically-insulating layer material, for example a glass cloth, which does not interfere with the later penetration of the active metal (in particular lithium).

The invention is illustrated in more detail hereafter based on exemplary embodiments shown in the figures. The technical features shown therein can be used individually or in combination to create preferred embodiments of the invention. In the figures.

Figure 1:
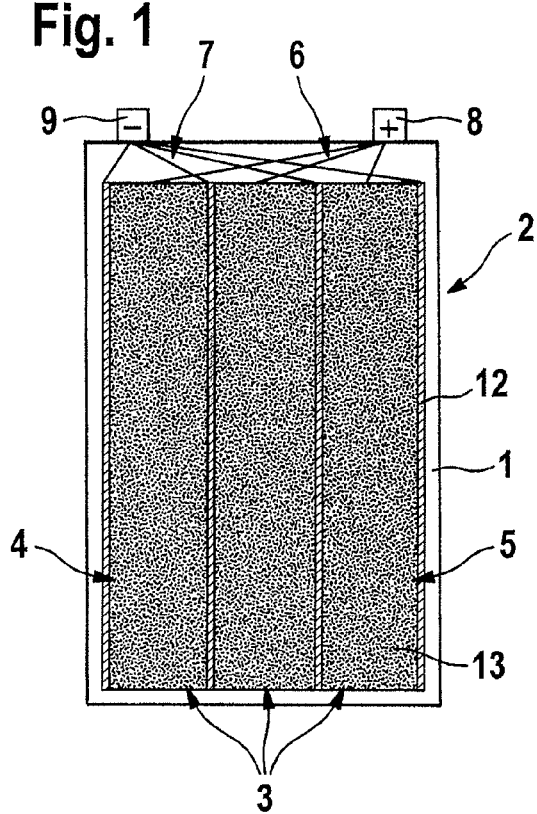
FIG. 1 shows a cross-sectional view of a battery according to the invention.

The housing 1 of the battery 2 shown in FIG. 1 consists, for example, of stainless steel and contains a plurality of battery cells 3, each having a positive electrode 4 and a negative electrode 5. The electrodes 4, 5 are—as is common in battery engineering—connected to terminal contacts 8, 9 by means of electrode leads 6, 7. Electrodes 4, 5 are shaped as layers—as is also common—having a thickness which is small relative to their extension in the other two dimensions. Obviously, a bipolar design (serial circuiting), instead of the parallel circuiting of the cells shown, is also feasible.

Figure 2:
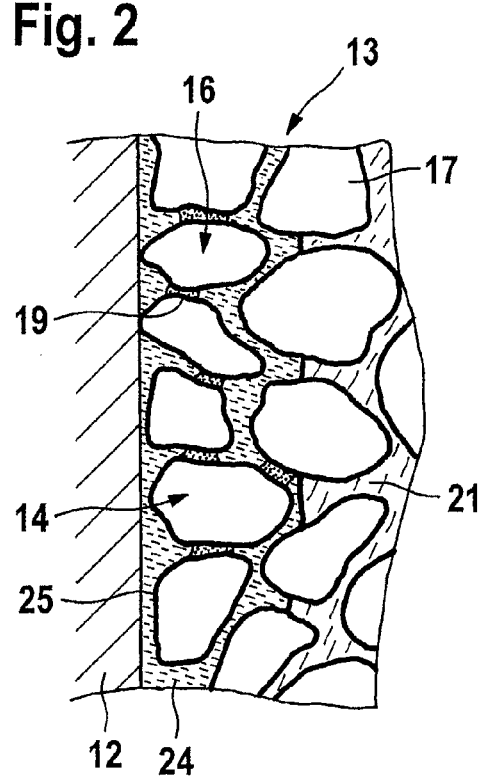
FIG. 2 shows a schematic view of the substrate of the negative electrode and the porous positive electrode layer, the pores of which are penetrated by active metal of the negative electrode.

One particularity of the electrode arrangement of cells according to the invention, shown separately in FIG. 2, is that the electronically conductive substrate 12 forming the current collector element of the negative electrode is located immediately adjacent to a porous structure 13 which contains the active mass of the positive electrode (porous positive electrode layer) such that lithium (active metal of the negative electrode) deposited during charging of the cell penetrates into the pores 14 of layer 13. The current collector element 12 of the negative electrode is much thinner than the porous positive electrode layer. In this and in other respects, the schematic views of the figures are not true to scale. Preferably, the porous positive electrode layer is at least 10 times as thick as the electronically conductive layer that forms the current collector element 12.

According to the invention electrodes 4, 5 are not disposed in separate layers (macroscopically separated subspaces) of the cell, but rather the active mass of the positive electrode is simultaneously a structural component of a porous layer which is adapted and arranged such that the lithium is taken up and deposited at least partly in metallic form in its pores during the charging of the cell. The heretofore customary spatial separation of (i) the parts of the cell providing the required lithium uptake capacity and (ii) the parts of the cell containing the positive active mass, both parts shaped as separate layers, is not provided. The cell only contains the two functional layers shown in the figures, namely the electronically conductive substrate 12 of the negative electrode and the porous positive electrode layer 13.

FIG. 2 shows a strongly simplified schematic view of a microscopic enlargement of a section of the porous positive electrode layer 13 in the vicinity of the negative current collector element 12. In the embodiment shown structure-forming particles 16 of the layer 13 consist of the active mass 17 of the positive electrode 4 (e.g. $LiCoO_2$). The structure-forming particles 16 are bonded to each other by means of a binding agent 19 whose quantity is such that it is concentrated only in places at which the structure-forming particles 16 contact each other, whereas numerous connection channels between the pores 14 of the porous positive electrode layer 13 remain in other places. The pores 14 of the layer 13 are filled with electrolyte prior to the first charging. Methods are known by means of which it can be ensured that the electrolyte penetrates even into fine pores of a porous layer during the filling process. A suitable method is described in WO 2005/031908, for example.

FIG. 2 also shows how the active metal 24 of the negative electrode, for example lithium, grows into the pores 14 of the porous positive electrode layer 13 when it is deposited at the surface of the current collector element 12 during the charging of the cell. The required separation of the active masses 24, 17 of the two electrodes is provided by an intraporous separator layer 25 which covers the entire internal surface of the porous positive electrode layer 13, i.e. the surface of its structure-forming particles 16.

As mentioned above, the intraporous separator layer can be created during manufacture of the battery 2 having cells 3 by coating the surface of the structure-forming particles with a covering layer that possesses the required properties (insulation against electronic conduction, permeability for ions, no detrimental effects on the remaining components of the cell). Suitable coating materials include in particular, ion-conductive glasses. Many variants are possible with regard to the components contained therein, for example metal oxides or metal sulfates. In this context, existing scientific studies can be used which were carried out in particular as part of research into solid electrolytes. Research results of this type have been published, for example, in:

P. Hagenmuller, W. Van Gool (Editors): Solid Electrolytes, Academic Press, year of publication 1978, wherein reference can be made, in particular, to the publication by D. Ravaine et al. "Ionic Conductive Glasses" pp. 277 to 290.

An embodiment of the invention in which the intraporous layer is formed in situ is particularly preferred. This formation process takes place mainly during the first charging cycles. The intraporous separator layer can be formed either by the manufacturer of the battery or at the location of the user.

Preferably, the porous positive electrode layer 13 is arranged on the substrate 12 of the negative electrode 5 so tightly that no hollow spaces are present inbetween, which would allow accumulation of active metal 24 deposited in metallic form during the charging of the cell. Preferably, any such hollow spaces should not be substantially larger than the pores of the porous positive electrode layer 13.

With the cell design of the invention, penetration of the active metal into the positive electrode causes continuous changes of the shape and structure of the positive electrode layer during charging and discharging of the cell. However, in the context of the invention it has been found that this is not detrimental for the cell to such an extent that serious interference with its function results.

Figure 3:
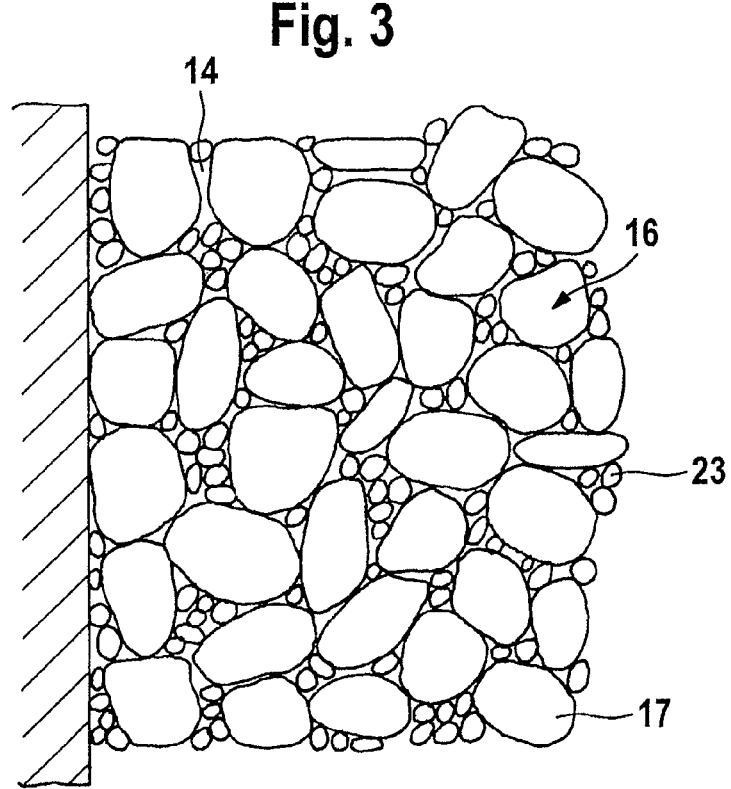
FIG. 3 shows a schematic view similar to FIG. 2 with a porous positive electrode layer the pores of which contain a material suitable for storing the active metal of the negative electrode.

According to a further preferred embodiment, shown in FIG. 3, a material 23 suitable for storing the active metal of the negative electrode is located within the pores 14 of the porous positive electrode layer 13. Such a material will—without limiting the generality—hereafter be referred to as "lithium-storing material". Different solids capable of taking up lithium are suitable as lithium-storing material. This includes, in particular, graphite, intercalation compounds and metals forming alloys with lithium. Although the presence of a material of this type in the pores 14 of the porous positive electrode layer 13 slightly increases the volume required for taking up the active metal resulting from the electrode reaction and thus reduces the maximal energy density, this feature can be advantageous, in particular in order to increase the conductivity and thus reduce the internal resistance of the battery cell. As before, also with this design a part of the lithium is stored in metallic form. In general, this fraction should be at least 30, particularly preferably at least 50%, relative to the total amount of lithium stored in a completely charged cell.

The electronically conductive substrate 12 can be completely made of metal, preferably of nickel. A simple nickel sheet is suitable, but other metal structures, in particular in the form of a perforated plate or similar, are feasible. According to a further alternative embodiment, the electronically conductive substrate 12 of the negative electrode may consist, at least in part, of a material suitable for storing its active metal, i.e. in particular of a lithium-storing material. In an embodiment of this type, a part of the lithium resulting from the electrode reaction during the charging of the cell is initially stored in the electronically conductive substrate of the negative electrode. As before, active metal is deposited in metallic form in the pores of layer 13 at least during part of the charging process.

During the experimental testing of the invention, experimental electrodes with a geometric surface of 1 cm$^2$, having a porous positive electrode layer, were prepared as follows:

The components of the electrode layer, namely 94% lithium-cobalt oxide, 4% binding agent (PTFE), and 2% carbon black were mixed in the dry state.

The mixture was taken up in isopropanol resulting in a paste whose solvent content was approx. 20 to 30 wt. %.

The paste was homogenized by stirring and then pasted into a current collector element made from nickel foam.

Subsequently, a drying step followed by a pressing step was carried out until a porosity of 35% was attained, and then a thermal treatment involving heating to 370° C. for 1 hour.

These experimental electrodes were then used in a three-electrode cell to carry out voltametric experiments with the experimental electrode serving as working electrode, with a counter-electrode made of nickel sheet onto which lithium was deposited during the charging, and with a nickel electrode covered with lithium metal serving as reference electrode. The arrangement of the electrodes in the cell differed from the common arrangement of experimental cells of this type in that the working and counter-electrode were arranged so closely adjacent to each other that there was just no electrical contact between them before the start of the charging cycle. Due to this arrangement the metallic lithium deposited during the charging contacted the working electrode. In conventional chargeable battery cells, this corresponds to an internal short circuit and leads, for example in the case of Li ion battery systems, to safety-critical states.

Figure 4:
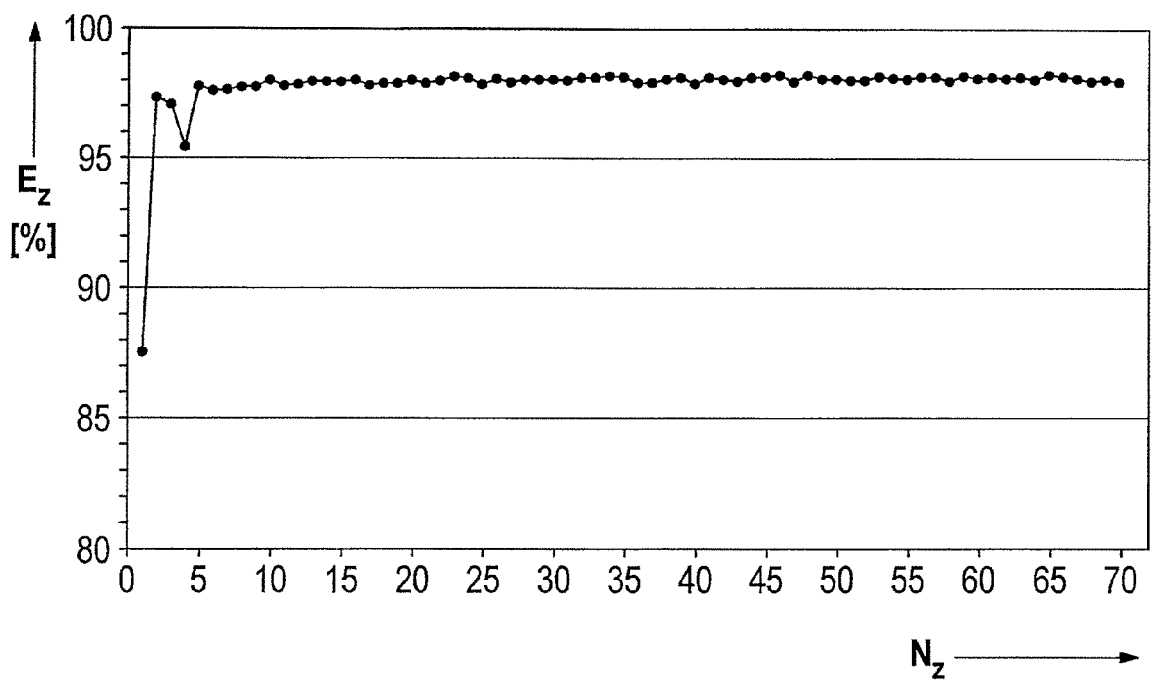
FIG. 4 shows measuring results obtained during the experimental testing of the invention by means of cyclic voltammetry.

FIG. 4 shows the cycle efficiency $E_z$ plotted against the number of cycles $N_z$ for 70 cycles as the result of voltammetric tests using the experimental set-up described above with LiAlCl$_4$×1.5 SO$_2$ as electrolyte and an addition of 3% LiF. In this context, the cycle efficiency is defined as the percentage of the electrical energy generated during the discharging of the cell (discharge capacity) relative to the electrical energy consumed for charging (charge capacity).

The results shown in FIG. 4 demonstrate that the cycle efficiency is reduced during the first cycles. This can be attributed to the formation of an intraporous separator layer during these cycles. The charge capacity required for this process is not available during the discharging of the cell. After a few cycles (after 4 cycles in the case shown), a cycle efficiency of more than 97% is attained and then remains constant.

In a second experiment, a second type of experimental electrodes was prepared. Lithium-cobalt oxide was mixed with 1.5 wt. % aerosil and 1.5 wt. % powdered borosilicate glass. Mixed in the dry state, the substances were then taken up in water. A thermal treatment was carried out at 500° C. for 25 minutes. Tests analogous to experiment 1 using three-electrode cells made with these experimental electrodes yielded similar results. However, the cycle efficiency was during the first cycles less reduced, because there was only a small degree of in situ-formation of an intraporous separator layer.

According to the results of the experimental tests, the glass does not need to be ion-conductive in its original state. It was found that an ion-conductive glass can be formed in situ from a previously non-ion-conductive glass, in particular borosilicate glass. This is attributed to a reaction sequence in which initially lithium hydroxide is formed from the lithium-cobalt oxide of the positive electrode reacting with water and then lithium oxide is formed from the lithium hydroxide by uptake of water. The resulting lithium oxide is incorporated into the glass and effects the required ion conductivity.

In order to check the surprising results of the experiments with the three-electrode-cells, the electrode material from experiment 1 was used to set up complete battery cells according to the invention of the system: (Ni sheet) Li/LiAlCl$_4$×1.5 SO$_2$/LiCoO$_2$. Between the nickel sheet 12 and the porous positive electrode layer 13 a very thin coarsely-porous glass cloth of 60 µm thickness was provided, by means of which the current collector element 12 and the porous positive electrode layer 13 were insulated from each other prior to the start of the charging process. This cloth is no barrier for the lithium deposited at the surface of the current collector element 12. Therefore the lithium is in full contact to the active mass 17 of the positive electrode immediately after the start of the charging process.

Figure 5:
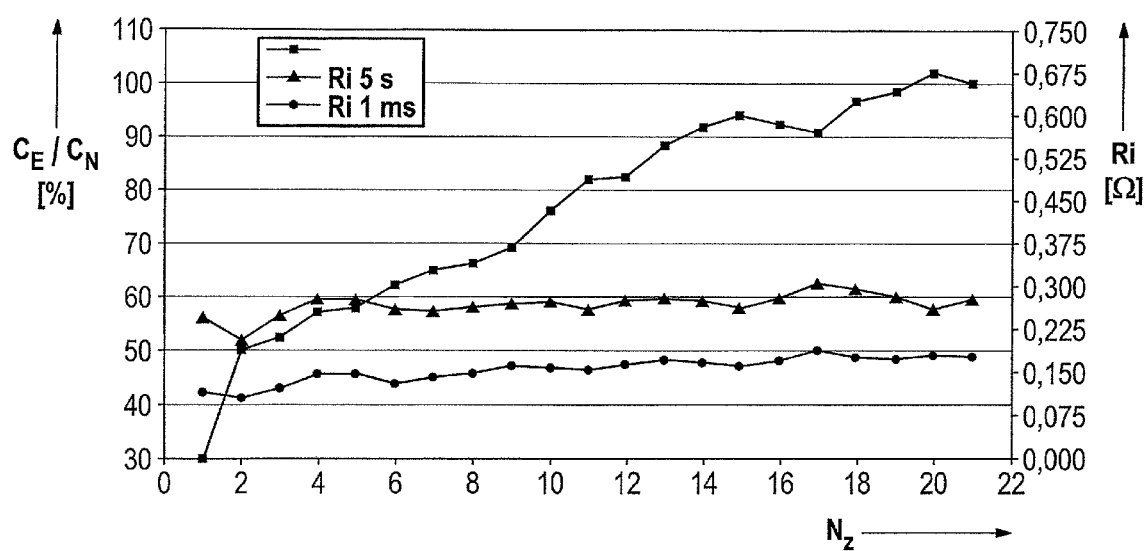
FIG. 5 shows measuring data of cells according to the invention.

FIG. 5 shows results of these experiments. The ratio of the capacity that can be obtained from the cell ($C_E$) and the nominal capacity ($C_N$) in %, and the internal resistance Ri of the cell after 1 ms and after 5 seconds are plotted against the number of the charging cycles. A continuous increase of the capacity up to 100% of the nominal capacity within the first 20 cycles and essentially constant resistance values are evident from the plot.

According to the current knowledge of the inventors the intraporous separator layer of the tested battery system is generated by reactions which are triggered by short-term, very strong local currents flowing when lithium contacts the LiCoO$_2$. These in turn trigger reactions of the electrolyte components and/or of secondary products commonly formed during the reactions taking place in the cell. The electrolyte components are LiAlCl$_4$ and SO$_2$. Secondary products are formed e.g. during charging and over-charging, for example in the form of lithium chloride (LiCl), aluminum chloride (AlCl$_3$), lithium dithionite (Li$_2$S$_2$O$_4$) and sulfurylchloride (SO$_2$Cl$_2$).

As has been mentioned before, the invention is not limited to the tested systems. Although the design according to the invention is not suitable for any and all battery systems it is, based on the explanations provided herein, possible without difficulty to test the suitability of different systems in combination with the design according to the invention and thereby to identify suitable system. In addition to the SO$_2$-based electrolyte, other electrolytes, including organic electrolytes, are capable of forming stabile covering layers that possess the required properties of electronic insulation, but ionic conductivity. Mixtures of organic electrolyte and SO$_2$-based electrolyte may in this context be particularly advantageous.

The invention claimed is:

1. A rechargeable electrochemical battery cell having a negative electrode, an electrolyte containing sulfur dioxide, a positive electrode and a reservoir for storing active metal resulting from an electrode reaction at the negative electrode during the charging of the cell, wherein
the cell contains a positive electrode layer having a porous structure comprising a structure-forming solid material and pores distributed therein, the structure-forming solid material comprising an active mass of the positive electrode,
the storing of the active metal resulting from the electrode reaction at the negative electrode takes place, at least in part, by deposition in metallic form, and
the positive electrode layer is arranged in the vicinity of an electronically conductive substrate of the negative electrode such that during charging of the cell at least a part of the active metal in metallic form resulting from the electrode reaction at the negative electrode penetrates into the pores of the porous structure comprising the active mass of the positive electrode and is deposited in the pores,
wherein the cell is configured such that the deposition of the active metal into the pores of the positive electrode layer causes the active metal to grow into the positive electrode layer.

2. The battery cell of claim 1, wherein the share by weight of the active mass of the positive electrode in the porous structure is at least 50%.

3. The battery cell of claim 1, wherein the porosity of the porous structure comprising the active mass of the positive electrode is between 20 and 80%.

4. The battery cell of claim 1, wherein the mean diameter of the pores of the porous structure comprising the active mass of the positive electrode is no more than 500 µm.

5. The battery cell of claim 1, wherein the porous structure comprising the active mass of the positive electrode comprises solid particles bonded to each other.

6. The battery cell of claim 5, wherein the solid particles of the porous structure comprising the active mass of the positive electrode are bonded to each other by means of a binding agent, the volume fraction of the binding agent being no more than 50% of the total solids volume of the porous structure.

7. The battery cell of claim 5, wherein the solid particles of the porous structure comprising the active mass of the positive electrode are bonded to each other by means of a binding agent, the volume fraction of the binding agent being no more than 30% of the total solids volume of the porous structure.

8. The battery cell of claim 5, wherein the solid particles of the porous structure comprising the active mass of the positive electrode are bonded to each other by means of a binding agent, the volume fraction of the binding agent being no more than 20% of the total solids volume of the porous structure.

9. The battery cell of claim 5, wherein the solid particles of the porous structure comprising the active mass of the positive electrode are bonded to each other by means of a binding agent, the volume fraction of the binding agent being no more than 10% of the total solids volume of the porous structure.

10. The battery cell of claim 1, wherein the porous structure comprising the active mass of the positive electrode contains an electronically conductive conductivity-improving material.

11. The battery cell of claim 10, wherein the electronically conductive conductivity-improving material is a particulate material of carbon or metal.

12. The battery cell of claim 1, wherein the porous structure comprising the active mass of the positive electrode is provided in the form of a layer, and is connected to an electronically conductive substrate of the positive electrode which is also layer-shaped.

13. The battery cell of claim 12, wherein the substrate of the positive electrode is provided as an open-pored layer, in particular as a metal foam layer, and the structure-forming material of the porous structure comprising the active mass of the positive electrode penetrates, at least partly, into the open-pored substrate.

14. The battery cell of claim 1, wherein in the operational state of the battery the internal surface of the porous structure comprising the active mass of the positive electrode is covered by an intraporous separator layer.

15. The battery cell of claim 14, wherein at least a part of the intraporous separator layer is generated in situ.

16. The battery cell of claim 15, wherein the intraporous separator layer is generated by a reaction comprising a component of the electrolyte as one of the reactants.

17. The battery cell of claim 14, wherein the intraporous separator layer is generated, at least in part, before the first charging of the cell by coating of the internal surface of the porous structure comprising the active mass of the positive electrode.

18. The battery cell of claim 17, wherein the intraporous separator layer is generated from an ion-conductive glass, an ion-conductive ceramic material or an ion-conductive plastic material.

19. The battery cell of claim 1, wherein the active metal of the negative electrode is selected from the group consisting of the alkali metals, the alkaline earth metals, and Zn.

20. The battery cell of claim 19, wherein the active metal of the negative electrode is lithium, sodium, calcium, or aluminum.

21. The battery cell of claim 1, wherein the substrate of the negative electrode is made, at least in part, from a material suitable for storing the active metal of the negative electrode.

22. The battery cell of claim 1, wherein the pores of the porous structure comprising the active mass of the positive electrode contain a material suitable for storing the active metal of the negative electrode.

23. The battery cell of claim 22, wherein the material suitable for storing the active metal is selected from the group consisting of graphite, an intercalation compound, and a metal suitable for forming an alloy with the active metal of the negative electrode.

24. The battery cell of claim 1, wherein the porous structure comprising the active mass of the positive electrode is arranged on the substrate of the negative electrode so tightly that no hollow spaces remain in between, in which active metal, resulting from the electrode reaction at the negative electrode during the charging of the cell, can accumulate in metallic form.

25. The battery cell of claim 1, containing at the boundary between the substrate of the negative electrode and the porous structure comprising the active mass of the positive electrode a device which prevents electronic conduction, but allows passage of the active metal resulting from the electrode reaction at the negative electrode during the charging of the cell.

26. The battery cell of claim 1, wherein the active mass of the positive electrode comprises a metal compound.

27. The battery cell of claim 26, wherein the active mass of the positive electrode comprises a metal oxide of a transition metal M, in particular of an element of atomic numbers 22 to 28.

28. The battery cell of claim 1, wherein the active mass of the positive electrode comprises an intercalation compound.

29. The battery cell of claim 1, wherein the volume of the electrolyte in the cell corresponds to no more than two times the free pore volume of the porous structure comprising the active mass of the positive electrode.

30. The battery cell of claim 1, wherein the electrolyte contains a conductive salt that is selected from the group consisting of the halogenides, oxalates, borates, phosphates, arsenates, and gallates of an alkali metal.

31. The battery cell of claim 30, wherein the electrolyte contains, in addition to the conductive salt, a further salt, in particular an alkali halogenide.

32. The battery cell of claim 30, wherein the electrolyte contains, in addition to the conductive salt, an alkali fluoride.

33. The battery cell of claim 30, wherein the electrolyte contains, in addition to the conductive salt, lithium fluoride.

34. The battery cell of claim 1, wherein the energy density of the cell is more than 750 Wh/l.

35. The battery cell of claim 1, wherein the components of the cell are distributed macroscopically homogenously.

36. The battery cell of claim 1, wherein the share by weight of the active mass of the positive electrode in the porous structure is at least 80%.

37. The battery cell of claim 1, wherein the porosity of the porous structure comprising the active mass of the positive electrode is between 25 and 50%.

38. The battery cell of claim 1, wherein the porosity of the porous structure comprising the active mass of the positive electrode is between 25 and 75%.

39. The battery cell of claim 1, wherein the mean diameter of the pores of the porous structure comprising the active mass of the positive electrode is no more than 100 μm.

40. The battery cell of claim 1, wherein the mean diameter of the pores of the porous structure comprising the active mass of the positive electrode is no more than 10 μm.

41. The battery cell of claim 1, wherein the active mass of the positive electrode comprises a metal oxide.

42. The battery cell of claim 1, wherein the volume of the electrolyte in the cell corresponds to no more than the free pore volume of the porous structure comprising the active mass of the positive electrode.

43. The battery cell of claim 1, wherein the energy density of the cell is more than 1000 Wh/l.

44. The battery cell of claim 1, wherein the energy density of the cell is more than 1250 Wh/l.

45. The battery cell of claim 1, wherein the energy density of the cell is more than 1500 Wh/l.

46. The battery cell of claim 1, wherein the electrolyte contains a conductive salt that is a gallate of lithium.

47. The battery cell of claim 1, wherein the active mass changes its electric charge state during a redox reaction at the positive electrode.

48. A rechargeable electrochemical battery cell having a negative electrode, an electrolyte containing sulfur dioxide, a positive electrode and a reservoir for storing active metal resulting from an electrode reaction at the negative electrode during the charging of the cell, wherein
the cell contains a positive electrode layer having a porous structure comprising a structure-forming solid material and pores distributed therein, the structure-forming solid material comprising an active mass of the positive electrode,
the active mass of the positive electrode is arranged in the vicinity of an electronically conductive substrate of the negative electrode, and
the components of the cell being arranged such that
the storing of the active metal resulting during the charging of the cell from the electrode reaction at the negative electrode takes place, at least in part, by deposition in metallic form, and
during charging of the cell at least a part of the active metal resulting from the electrode reaction at the negative electrode penetrates in metallic form into the pores of the porous structure comprising the active mass of the positive electrode and is deposited in the pores causing the active metal in metallic form to grow into the positive electrode layer.

49. A rechargeable electrochemical battery cell comprising:
a negative electrode,
an electrolyte containing sulfur dioxide, and
a positive electrode, wherein
the cell contains a positive electrode layer having a porous structure comprising a structure-forming solid material and pores distributed therein, the structure-forming solid material comprising an active mass of the positive electrode,
the active mass of the positive electrode is arranged in the vicinity of an electronically conductive substrate of the negative electrode, and
during at least at some point of operation of the battery the pores of the porous structure have deposited therein active metal in metallic form formed from an electrode reaction at the negative electrode during the charging of the cell.

* * * * *